United States Patent [19]

Dettmer et al.

[11] Patent Number: 5,187,988
[45] Date of Patent: Feb. 23, 1993

[54] APPARATUS FOR MEASURING THE FLOW OF A FLUID MEDIUM

[75] Inventors: Hans J. Dettmer, Göttingen; Jorg Herwig, Kassel; Joachim Hagemann, Göttingen; Werner Marchewka, Eichenberg; Michael Ützfeld, Kassel, all of Fed. Rep. of Germany

[73] Assignee: Fischer & Porter Company, Warminster, Pa.

[21] Appl. No.: 675,504

[22] Filed: Mar. 26, 1991

[30] Foreign Application Priority Data

Mar. 28, 1990 [DE] Fed. Rep. of Germany ....... 4009959

[51] Int. Cl.⁵ .............................................. G01F 1/24
[52] U.S. Cl. ............................ 73/861.53; 73/861.56; 73/DIG. 5
[58] Field of Search ....................... 73/861.53–861.58, 73/DIG. 5

[56] References Cited

U.S. PATENT DOCUMENTS 4,619,146 10/1986 Teodorescu et al. ............. 73/861.54
4,787,253 11/1988 de Fasselle et al. ............. 73/861.54
4,944,190 7/1990 Scally et al. ..

FOREIGN PATENT DOCUMENTS 3027763 2/1981 Fed. Rep. of Germany .
3411156 10/1985 Fed. Rep. of Germany .
2195768 4/1988 United Kingdom .
2219662 12/1989 United Kingdom .

Primary Examiner—Herbert Goldstein
Attorney, Agent, or Firm—Ratner & Prestia

[57] ABSTRACT

Apparatus for measuring the flow of a fluid medium which flows upward through a substantially vertically mounted tube section having a suspended body in the tube section. The vertical position of the suspended body depends on the intensity of the flow. Movement of a magnet, movable with the suspended body, is sensed by a unit which includes a Hall sensor and an electronic evaluation circuit, responsive to the Hall sensor output, develops an output signal corresponding to the flow of the medium.

17 Claims, 6 Drawing Sheets

APPARATUS FOR MEASURING THE FLOW OF A FLUID MEDIUM

TECHNICAL FIELD

The present invention relates to an apparatus for measuring the flow of a fluid medium.

BACKGROUND OF THE INVENTION

In apparatus of this kind, the vertical position of a body suspended in a tube section is substantially proportional to the flow of the fluid medium flowing through the tube section but dependent on the shape and dimensions of the tube section and suspended body, the nature of the medium and the operating conditions. A signal which indicates the vertical position of the suspended body is therefore usually not linearly dependent on the vertical position of the suspended body.

This non-linearity is of particular disadvantage in apparatus of this kind in which the length of tubing is opaque, e.g. made of metal.

Frequently, data transducers connected downstream or other secondary apparatus also operate in a linear manner. If the signals conveyed to them are not linearly dependent on the vertical position of the suspended body, the signals which they emit are not linear either. Any associated displays must therefore have non-linear scales or the like, which is extremely awkward from the manufacturer's point of view. This also applies when non-linear mechanical couplings are provided in order to make a display linear.

SUMMARY OF THE INVENTION

The aim of the present invention is to provide an apparatus by means of which linear output signals can be generated without very great difficulty, these signals being dependent on the non-linear vertical position of the suspended body.

According to the present invention, the necessary linearization can readily be achieved within an electronic evaluation circuit.

According to another aspect of the present invention, a magnet which moves in the tube section according to the fluid flow through the tube section and to which a sensor unit is responsive may be a permanent magnet or an electromagnet with DC or AC excitation.

According to yet another aspect of the present invention, in order to obtain a simple visual display, a pointer or the like can be mounted on a follower magnet to indicate the vertical position of the suspended body.

A further aspect of the present invention is to compensate for any aging of the follower magnet.

Still another aspect of the present invention is the incorporation of a microprocessor in the electronic evaluation circuit which linearizes non-linear input signals.

The present invention makes possible developing an indication of the output signal on site or at a distant location and, if necessary, the display of other data.

Yet further aspects of the present invention are the incorporation of a digital low pass filter and a curve interpolator (the term "spline interpolator" is used herein as in Bronstein's book "Numerische Mathematik", page 799) in the evaluation circuit.

BRIEF DESCRIPTION OF THE DRAWINGS

The present invention is hereinafter described by means of embodiments by way of example with reference to the accompanying drawings.

Identical reference numerals have been used to denote identical or substantially identical elements.

DETAILED DESCRIPTION OF THE INVENTION

Figure 1:
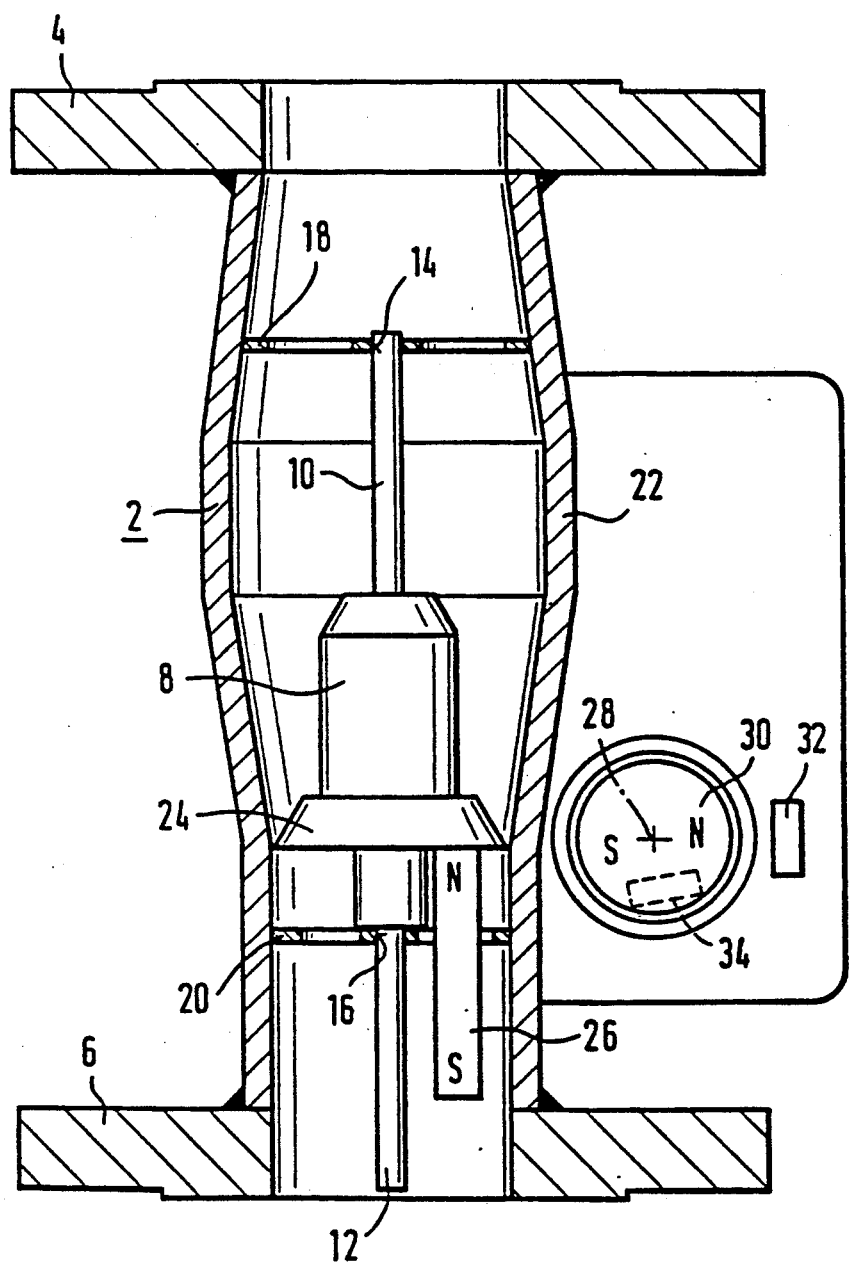
FIG. 1 shows a first embodiment of the present invention with a modification shown in dash-dot lines.

The apparatus according to FIG. 1 comprises a substantially vertically mounted tube section 2 through which a medium flows from the bottom to the top. At the ends of the tube section 2 are fixing flanges 4 and 6. Arranged in the tube section 2 is a suspended body 8, to which guide rods 10 and 12 are fixed at the top and bottom which are guided in guide bores 14 and 16 in cross-webs 18 and 20 passing transversely through the tube section 2. The suspended body 8 is shown in a low position. Above this low position, the tube section 2 has a widened portion 22. The determining factor for the vertical position of the suspended body 8 is a frustoconical cone 24 attached to the bottom of the suspended body 8 and tapering in the direction of flow. In this embodiment, a rod shaped permanent magnet 26, extending in the direction of flow, is attached to the underside of this frustoconical cone 24. Outside the tube section 2 in this embodiment, a second permanent follower magnet 30 is rotatably mounted about a spindle 28, whilst a pointer (not shown) may be provided on said magnet 30. Outside the rotatable permanent magnet 30 is a Hall element 32 which is influenced by the magnetic field of the permanent magnet 30. The second Hall element 34 may be arranged on the permanent magnet 30.

Figure 2:
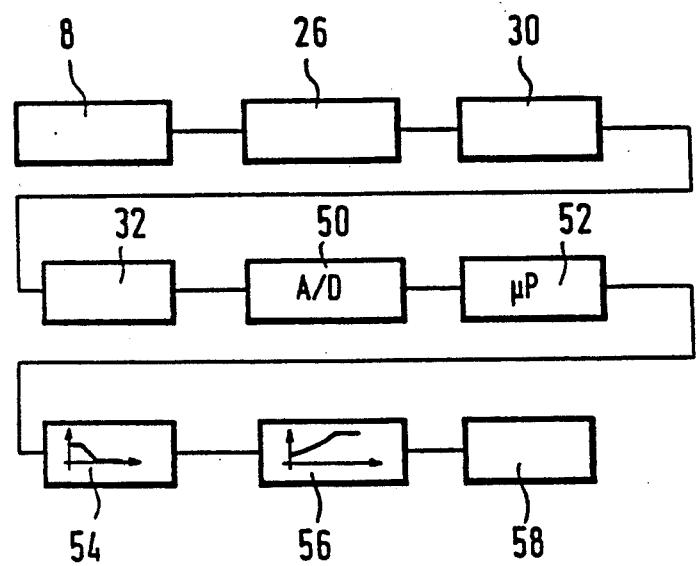
FIG. 2 shows a block circuit diagram of an electronic evaluation circuit for the embodiment according to FIG. 1.
Figure 6:
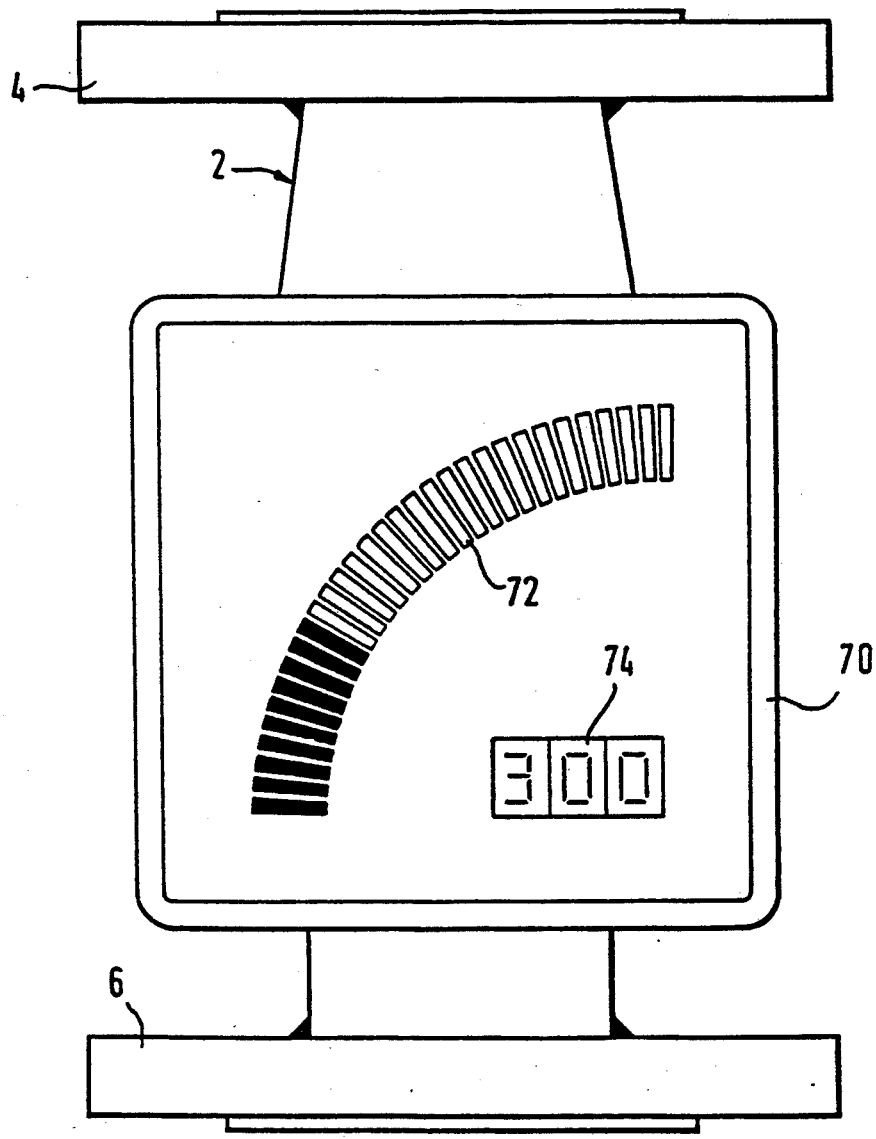
FIG. 6 shows the front of a display apparatus.
Figure 7:
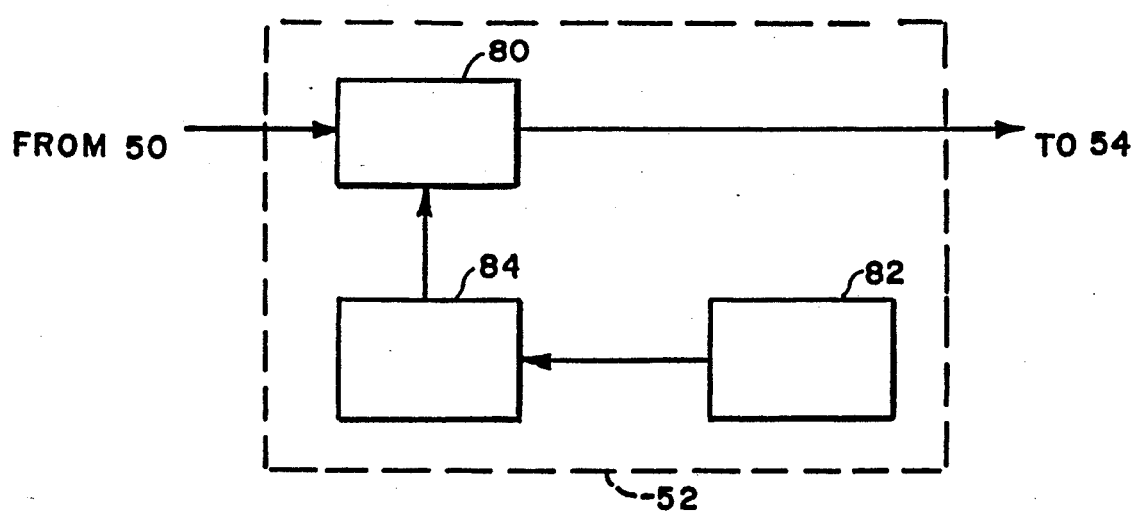
FIG. 7 shows a block circuit diagram of the details of the microprocessor of FIG. 2.

The block circuit diagram in FIG. 2 diagrammatically shows how the vertical position of the suspended body 8 affects the position of the permanent magnet 26, how the position of the permanent magnet 26 affects the position of the permanent magnet 30 and how the position of the permanent magnet 30 affects the Hall element 32. The signal emitted by the Hall element 32 passes through an A/D converter 50, the output signal from the A/D converter 50 passes to a $\mu/P$ 52 (digital microprocessor), the output signal from $\mu/P$ 52 passes via a digital software low pass filter 54 with programmable time characteristics and spline interpolator 56 which interpolates curves of the third order to an output circuit 58 for a display apparatus as shown in FIG. 6. As shown in FIG. 7, the $\mu/P$ 52 contains a RAM 80 for storing the signals emitted by the A/D converter 50, an EEPROM 82 for storing correction data and an EPROM 84 for correcting the signals stored in the RAM 80 by means of the correction data stored in the EEPROM 82.

Figure 3:
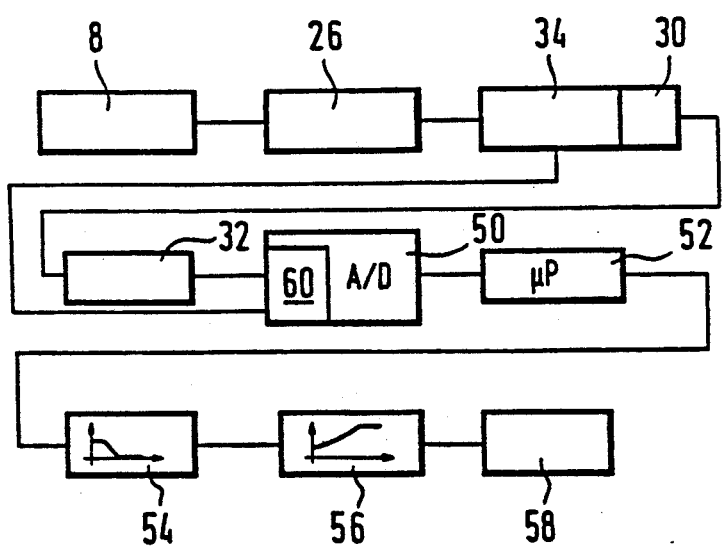
FIG. 3 shows a block circuit diagram of an electronic evaluation circuit for the above-mentioned modification of the embodiment in FIG. 1.

The block circuit diagram according to FIG. 3 differs from the block circuit diagram according to FIG. 2 only in the fact that signals emitted from the Hall element 34 according to FIG. 1 are also processed. The signals emitted from this Hall element 34 are independent of the position of the permanent magnet 30 and normally change only as a result of the aging of the permanent magnet 30. The signal emitted by the Hall element 34 can thus be regarded as a reference signal. For comparing this reference signal with the signal emitted by the Hall element 32, there is a multiplexer 60 in the input of the A/D converter 50.

Figure 4:
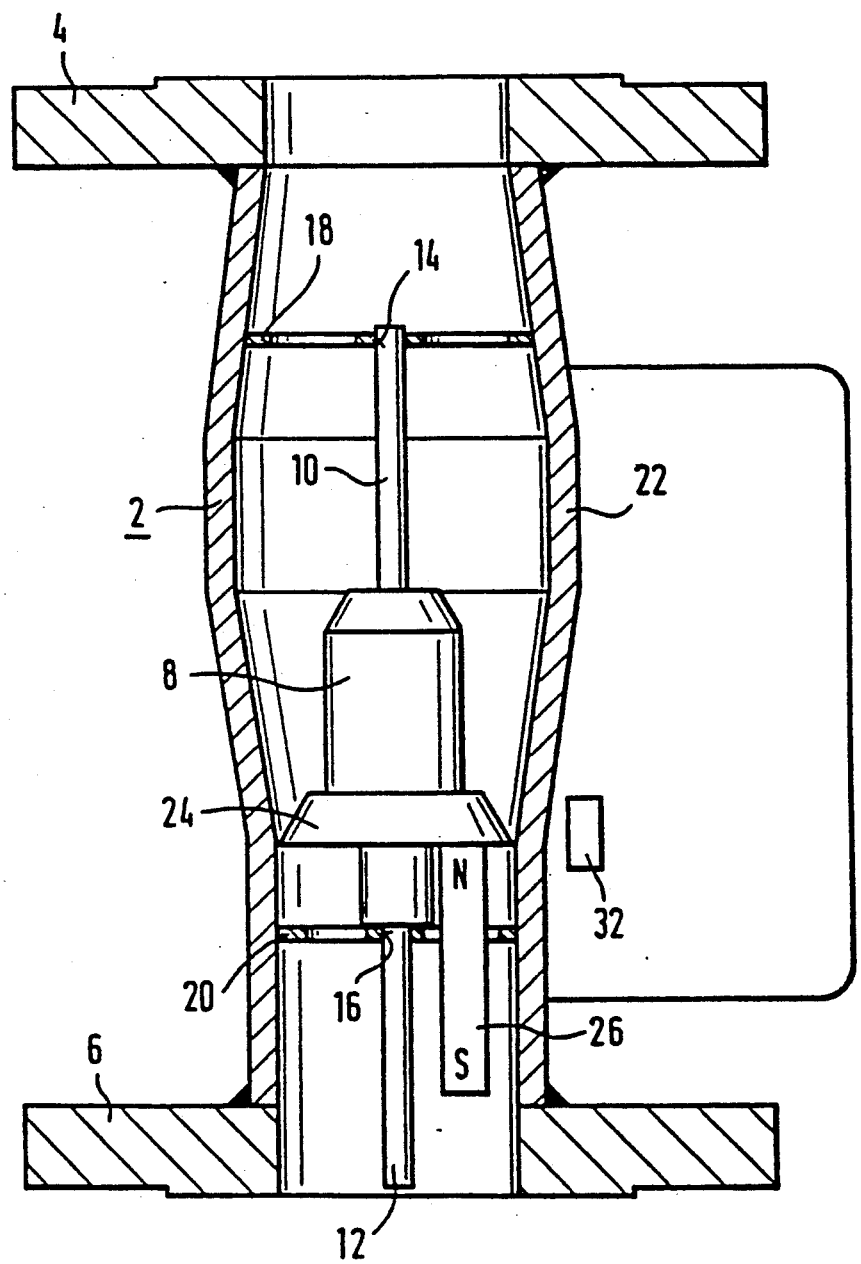
FIG. 4 shows a second embodiment of the present invention.
Figure 5:
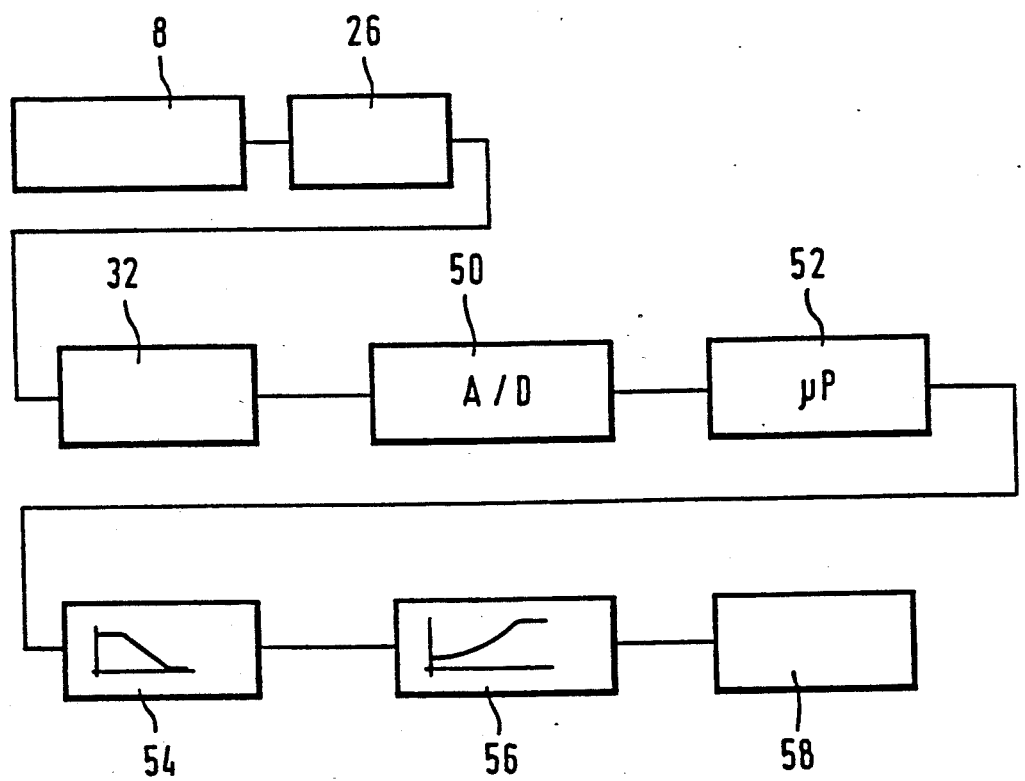
FIG. 5 shows a block circuit diagram of an electronic evaluation circuit for the second embodiment of the present invention.

In the embodiment shown in FIG. 4, the permanent magnet 30 according to FIG. 1 or an equivalent thereof is omitted. The Hall element 32 is influenced directly by the magnetic field issuing from the permanent magnet 26. Accordingly, the associated block circuit diagram shown in FIG. 5 is simplified, but also corresponds to the block circuit diagram shown in FIG. 2, so that there is no need for any further description.

FIG. 6 shows a display apparatus 70, preferably an LC display, with a digital block indicator (bar graph) 72 and a numerical digital display 74. The display apparatus 70 is connected to the output circuit 58. The flow rate display can be in physical units or as a percentage of the maximum flow rate. The display apparatus 70 may also have a display of adjustment parameters (not shown).

The following texts are incorporated by reference to the extent necessary for adequacy of the disclosure of the present invention:
(1) Bronstein "Numerische Mathematik" pages 796-799
(2) "Taschenbuch 2 Elektrotechnik" Carl Hauser Verlag, 1st edition, pages 542-546
(3) "Handbuch fur Hochfrequenz—und Elektrotechnik" Volume II, 13th edition, pages 129 and 130, pages 228 and 229, pages 289 and 290

What is claimed is:

1. Flow measuring apparatus comprising:
a vertically disposed tube section;
a body suspended within said tube section and movable vertically within said tube section in response to fluid flowing through said tube section, the vertical position of said body dependent upon the flow rate of said fluid flowing through said tube section;
a magnet attached to said body and movable within said tube section with said body;
sensing means positioned externally of said tube section and including:
  (a) a rotatably mounted magnet movable in response to said magnet movable with said body, and
  (b) a Hall sensor responsive to movement of said rotatably mounted magnet for developing a sensor signal representative of the position of said magnet movable with said body;
and electronic evaluation circuit means responsive to said sensor signal and having means for linearizing said sensor signal for developing an output signal representative of said flow rate of said fluid flowing through said tube section.

2. Flow measuring apparatus according to claim 1 wherein said electronic evaluation circuit means include:

(a) an analog-to-digital converter responsive to said sensor signal for converting said sensor signal into a digital signal,
  (b) a digital processor for processing said digital signal,
  (c) a digital low pass filter for filtering said digital signal after processing,
  (d) a curve interpolator for interpolating said digital signal after processing and filtering, and
  (e) an output circuit for supplying said digital signal as said output signal after said digital signal has been processed, filtered and interpolated.

3. Flow apparatus according to claim 2 wherein said digital processor includes:
  (a) a RAM for storing said digital signal,
  (b) an EEPROM for storing correction data, and
  (c) an EPROM for correcting said digital signal stored in said RAM by means of said correction data stored in said EEPROM.

4. Flow measuring apparatus according to claim 2 wherein said digital low pass filter is a digital software filter having programmable time characteristics.

5. Flow measuring apparatus according to claim 2 wherein said curve interplator interpolates curves of the third order.

6. Flow measuring apparatus according to claim 1 further including a display responsive to said output signal for displaying said flow rate of said fluid flowing through said tube section.

7. Flow measuring apparatus according to claim 6 wherein said display includes an analog display.

8. Flow measuring apparatus according to claim 6 wherein said display includes a digital display.

9. Flow measuring apparatus according to claim 6 wherein said display displays physical units of said flow rate.

10. Flow measuring apparatus according to claim 6 wherein said display displays a percentage of maximum flow rate.

11. Flow measuring apparatus comprising:
a vertically disposed tube section;
a body suspended within said tube section and movable vertically within said tube section in response to fluid flowing through said tube section, the vertical position of said body dependent upon he flow rate of said fluid flowing through said tube section;
a magnet attached to said body and movable within said tube section with said body;
sensing means positioned externally of said tube section and including:
  (a) a rotatably mounted magnet movable in response to said magnet movable with said body,
  (b) a first Hall sensor responsive to movement of said rotatably mounted magnet for developing a sensor signal representative of the position of said magnet movable with said body, and
  (c) a second Hall sensor movable with said rotatably mounted magnet for supplying a reference signal;
and electronic evaluation circuit means responsive to said sensor signal and said reference signal and having means for linearizing said sensor signal for developing an output signal representative of said flow rate of said fluid flowing through said tube section.

12. Flow measuring apparatus according to claim 11 wherein said electronic evaluation circuit means include:

(a) an analog-to-digital converter responsive to said reference signal and said sensor signal for converting said reference signal and said sensor signal into digital signals, (b) a digital processor for processing said digital signals, (c) a digital low pass filter for filtering said digital signals after processing, (d) a curve interpolator for interpolating said digital signals after processing and filtering, and (e) an output circuit for supplying said digital signal corresponding to said sensor signal as said output signal after said digital signals have been processed, filtered and interpolated.

13. Flow apparatus according to claim 12 wherein said digital processor includes:

(a) a RAM for storing said digital signals, (b) an EEPROM for storing correction data, and (c) an EPROM for correcting said digital signals stored in said RAM by means of said correction data stored in said EEPROM.

14. Flow measuring apparatus according to claim 12 wherein said digital low pass filter is a digital software filter having programmable time characteristics.

15. Flow measuring apparatus according to claim 12 wherein said curve interpolator interpolates curves of the third order.

16. Flow measuring apparatus comprising:

a vertically disposed tube section;

a body suspended within said tube section and movable vertically within said tube section in response to fluid flowing through said tube section, the vertical position of said body dependent upon the flow rate of said fluid flowing through said tube section;

a magnet movable within said tube section with said body;

sensing means, including a Hall sensor, positioned externally of said tube section and responsive to movement of said magnet for developing a sensor signal representative of the position of said magnet;

and an electronic evaluation circuit having:

(a) an analog-to-digital counter responsive to said sensor signal for converting said sensor signal into a digital signal, (b) a digital processor for processing said digital signal;

(c) a digital low pass filter for filtering said digital signal after processing, (d) a curve interpolator for interpolating said digital signal after processing and filtering, and (e) an output circuit for supplying said digital signal as a linearized output signal representative of said flow rate of said fluid flowing through said tube section after said digital signal has been processed, filtered and interpolated.

17. Flow measuring apparatus according to claim 16 wherein said Hall sensor is directly responsive to movement of said magnet.

* * * * *